April 9, 1963 T. B. WAYNE 3,085,012
PROCESS OF PREPARING A RICE PRODUCT
Filed Feb. 18, 1960 3 Sheets-Sheet 1

INVENTOR
TRUMAN B. WAYNE
BY
ATTORNEY

April 9, 1963 T. B. WAYNE 3,085,012
PROCESS OF PREPARING A RICE PRODUCT
Filed Feb. 18, 1960 3 Sheets-Sheet 2

INVENTOR
TRUMAN B. WAYNE
ATTORNEY

April 9, 1963 — T. B. WAYNE — 3,085,012
PROCESS OF PREPARING A RICE PRODUCT
Filed Feb. 18, 1960 — 3 Sheets-Sheet 3

INVENTOR.
TRUMAN B. WAYNE
BY
ATTORNEY

United States Patent Office 3,085,012
Patented Apr. 9, 1963

3,085,012
PROCESS OF PREPARING A RICE PRODUCT
Truman B. Wayne, P.O. Box 13086, Houston, Tex.
Filed Feb. 18, 1960, Ser. No. 9,574
6 Claims. (Cl. 99—81)

This invention relates to a process of preparing a rice product prepared from hulled, viz., milled brown or clean rice and the resultant product. This application is copending with applicant's application Serial No. 9,576, filed of even date herewith.

Rice in the form of shelled rice grains or kernels by removal of the hulls or husks from the rice grains or kernels is particularly difficult to prepare satisfactorily either in the home or the restaurant kitchen. It tends to become sticky and gummy with other than skilled and experienced preparation. Moreover, different varieties of rice require quite different handling, and as the average purchaser knows little about different rice varieties and their methods of preparation.

An object of this invention is to prepare a dehydrated, viz., precooked, porous rice product which may be regenerated into a highly satisfactory, uniform product in the average kitchen by a simple, standardized cooking procedure which will yield a fluffy, tender rice preparation, in which rice grains are discrete, that is stand apart as whole grains or kernels instead of being cooked into a sticky, gummy product which consists largely of conglomerates and broken grains.

In accordance with an illustrative embodiment of this invention shelled rice is first gelatinized by being precooked to a substantial degree, although not necessarily completely, and is then subjected to a process which dehydrates it and renders it very porous, so as to produce a dehydrated porous dry free-flowing product. This property of high porosity allows it to quickly reabsorb water and regenerate a soft cooked rice which is substantially the same as if the rice were prepared from the whole raw rice grain by cooking in accordance with the usual home or restaurant kitchen practices, or as done in industrial plants which utilize prepared, whole grain cereal foods, for instance containing rice, barley or corn. This regeneration of the processed rice product requires only a fraction of the time required for the usual method of preparation, and therefore results in a substantial time savings and convenience to the housewife or others who prepare cooked rice, or food preparations containing cooked rice, on a commercial or industrial scale. Moreover, its quality and cooking requirements have been largely determined and fixed in the manufacturing operation.

If the rice is precooked by steaming, the rice will have previously been steeped and then washed to remove fine, floury material before steaming; for such fine material tends to become more quickly gelatinized than the main body of the rice kernel and will contribute to stickiness in the mass, which causes difficulties in subsequent freezing, sublimation and drying operations. If, however, the rice is cooked in water following steeping, the prewashing may be omitted since a considerable amount of the fine gelatinized material washes off the rice kernels in the cooking operation. Also it is usually desirable to separate the mass of rice cooked by steaming, by gently agitating in cold water to cool it, wash off adhering surface stickiness, and to firm up the cooked rice for better handling in transferring to the freezer. In accordance with the illustrative embodiments as hereafter described, the rice is precooked in water to a moisture content of viz. 76–82%.

Rice, owing to its peculiar structure of having no completely starchy endosperm, but instead an interwoven network of glutinous proteins surrounding the starch cells, is a very sticky mass even when cooked, as distinguished from being crisper and more friable like corn which has a definite starchy endosperm and separate gluten. It is difficult to handle cooked rice in the usual drying or dehydration process to yield separate, discrete particles of the cooked rice. The least pressure, either applied in moving the mass or as static head in a vertical mass, results in a sticky conglomeration which dries to hard, horny lumps.

Procedures for freeze-drying of such expensive products such as biologicals, plasmas, etc., and such food stuffs as fruit juices, shrimp, oysters, meat and vegetables, have for their prime consideration the preserving of the same, and in the case of food stuffs to reduce their bulk and ease of storage. Another prime object of freeze-drying such products is to preserve the product in a frozen state (even when brought to a temperature slightly below the actual freezing points of such products) until ready for use; since drying materially above the freezing point of water, when maintained for an extended period, will cause the products to deteriorate.

The above noted products are not analogous to freeze-drying of gelatinized, viz., precooked rice, to produce a dehydrated porous rice product. Rice is, therefore, a special case due to the distribution of the glutinous proteins throughout its structure, which structure is wholly non-analogous to the above noted products as to properties and characteristics, and, therefore, influences its mode of treatment. Furthermore the cost of freeze-drying the above noted products is not of prime consideration. On the other hand rice must be supplied to the market at a comparatively low price.

This invention, therefore, is based on the discovery that indeed the unfavorable physical properties of gelatinized rice enables the product to be treated advantageously to allow production of a satisfactory dehydrated porous rice product in a process in accordance with an illustrative embodiment.

It should be observed that sublimation does not occur under static conditions. To the contrary, it can occur only under dynamic conditions, such as removal of ice vapor under the driving effect of high vacuum, or under the driving effect of air or other gas of low humidity which will effect partial removal of ice as ice vapor without substantial melting of ice into water vapor. This is possible with air of low humidity which, because of an evaporative cooling effect, does not raise the temperature of the product above 32° F. and thus produces substantial removal of ice vapor. Sublimation involves removal of ice vapor, while evaporation involves removal of water vapor.

The freezing point of gelatinized rice between 26° F. and 28° F., and at that temperature the gel-bound water and the interstitial water between the rice grains are frozen as ice. However, at that temperature the heat transfer is slow; accordingly to speed freezing process the temperature is carried below the freezing point of the gel (viz., +20° F. to −30° F.) so as to promote faster and more complete freezing throughout the gelatinized rice grains.

Generally stated, in accordance with this invention gelatinized rice is subjected to a freezing operation at a temperature sufficiently low and for a period sufficient so as to freeze the interstitial water and the gel-bound water as ice, and the frozen gelatinized rice is subjected to a sublimation operation under dynamic conditions, viz., under the driving action of a vacuum or while subject to the driving action of air or other gas of low humidity, and in the latter case while the product is within a temperature range including the temperature of the frozen gelatinized rice and up to 32° F., and for a period sufficient so as to remove a substantial part, viz., one-third to one-half of the ice as ice vapor, and so as to produce voids or pores in the rice product.

It is not economical to remove all of the bound water by sublimation, for that not only takes time but is expensive. After partial removal of the interstitial water and the gel-bound water by sublimation, the resulting rice product is sufficiently dry and free-flowing to permit its handling by a drying operation. Accordingly the sublimation operation is followed by subjecting the frozen gelatinized rice to a drying operation at a temperature above 32° F. and for a period sufficient to remove an additional substantial part of the water by evaporation. The rice product produced in accordance with this invention is capable of and is produced as a final product in the final dehydrated dry state whereby it can be stored for use at room temperature.

In the initial part of applicant's process, i.e., freezing followed by sublimation, a part of the moisture or water in the frozen mass is and must be removed under conditions of temperature where the shrunken, coagulated gel cannot reabsorb free moisture released by melting of the ice into water within the voids and surrounding the particles. If the latter occurs, the cooked rice with its original moisture content is regenerated. Therefore part of the moisture is first removed as ice vapor by sublimation. This not only reduces the total moisture content and thereby the possibility of regenerating the cooked rice with its original moisture content, but it also affords a somewhat drier, tougher product which is free flowing and which may then have its remaining moisture removed by evaporation by conventional warm air drying.

The two step process of coagulation by freezing, followed by limited sublimation, followed by finish drying at an elevated temperature above 32° F., results in reduction of the time of treatment and economy in time of operation and of cost.

The remaining gel-bound water, following the limited sublimation, is low enough so as to not cause softening and destruction of the porous structure, but causes the product to be sufficiently free flowing for subsequent treatment. Finish drying at elevated temperatures well beyond the sublimation range may be carried out to increase the voids or pores in the structure.

In accordance with an illustrative embodiment of this invention, the gelatinized rice, viz., precooked rice, is subjected to a temperature sufficiently low, viz., within the range of +20° F. to −30° F., or lower, to freeze the interstitial water and the gel-bound water as ice and as minute crystals throughout the gelatinized structure. The interstitial ice and the ice crystals of the gel-bound water are removed by sublimation within a temperature range including the temperature of the frozen gelatinized rice structure but not above the freezing point of the gelatinized rice, which is 26° F. to 28° F., and up to 32° F., so as to liberate a substantial part of the ice as ice vapor and so as to produce during that operation voids or pores in the rice product. Thereafter the resultant structure is subjected to a drying operation above the freezing point of water to further remove moisture by evaporation of the water. Following the limited sublimation the structure is sufficiently free flowing to permit the subsequent drying operation. The procedure is carried out therefore under conditions which are carefully controlled to prevent a substantial release of the liberated liquid phase moisture within the voids or pores formed by the freezing and sublimation operation when the frozen rice is subjected to a drying operation.

This invention is based on the discovery that unless the moisture removal is so controlled, the large amount of liquid phase liberated during thawing will be readily soaked up by the porous strongly lyophilic starch content of the cooked rice, and any attempt to dehydrate the product will result in destruction of a large proportion of the fine pores produced by the ice crystals. Even drying of the thawed rice by spreading in thin layers in ambient air results in the production of substantial proportions of horny, vitreous and shriveled grains and grain conglomerates which not only do not easily regenerate to a satisfactory product after short cooking periods, but are unsightly and break up into an excessive proportion of fines when handled in the drying, screening and packaging operations. Moreover, ambient air and sun drying are too slow for practicable factory production of the product in quantity, and any effort to speed the drying operation in tunnel or rotary dryers in heated air simply aggravates the above described difficulties.

Applicant has discovered that the high degree of porosity which is produced by quick freezing followed by laboratory freeze drying procedures, can be substantially preserved when processing under large scale production conditions by first removing a substantial part of this released moisture under controlled conditions whereby substantial wetting and reabsorption of moisture, with consequent destruction of pore space are prevented. Then following the removal of this released moisture, it is possible to complete the dehydration by conventional drying processes. Since the frozen rice particle is obviously not 100 percent pore space, there yet remains a substantial quantity of bound water in the shrunken gels still present in the particle which may then be removed by drying procedures which do not destroy the pores which have been formed by ice crystals and gel shrinkage, and which have been left substantially intact by removal of the liquid phase equivalent of these ice crystals under controlled conditions which prevent wetting of the pore walls with consequent reabsorption and swelling which closes these voids. Stated otherwise, since the quick freezing step was used to liberate water from the gel structures within the cooked rice, if the resulting pores or voids are desired in the finished product, they must be protected from contact with free water under conditions which will substantially regenerate the original gels and thereby the original cooked rice.

The objectives of the low temperature freezing process are two fold; first, there is a coagulation and shrinking of the starch gel, and also of the glutelins, a group of simple vegetable proteins such as glutenin and oryzenin, which have also become hydrated to a considerable degree under the process conditions. The freezing process tends to toughen the gel structures to a considerable extent and this reduces the extreme stickiness of some of the starch-glutelin gel mixtures or complexes resulting from the precooking process. This releases free water into the voids caused by coagulation and shrinkage, and the liberated water migrates to increase the size of any ice crystal nuclei which are present. Second, the freezing process in thus liberating water from these gels and partially denaturing the protein content of the latter sufficiently reduces the tendency of the individual grains to stick together, their tendency to mash under the slightest pressure and smear into sticky films which defeat materials handling procedures and foul vessels, conveyors, etc.

It is possible to completely remove the ice crystals by sublimation under laboratory or the so-called "commercial" freeze drying procedures. Under such conditions all of the liberated water in the form of ice crystals would be removed in the vapor state without passing through the liquid phase. Such processes are of very limited production capacity, are extremely slow and require large expenditures per unit of production for expensive, low capacity equipment. Consequently, aside from strictly laboratory uses of freeze drying, the process is limited to comparatively small productions of valuable products, largely biologicals, antibiotics and other expensive extremely heat-sensitive products.

This process is based on the careful application of freeze drying at its extreme upper temperature range where its production capacity reaches a maximum, followed (specifically) by high vacuum viz., 0.05 mm. to 4.5 mm., low temperature drying within a temperature range slightly above that of true freeze drying until substantially all remaining free moisture which has been liberated in the quick freezing step has been evaporated under conditions which prevent extensive absorption and rehydration. This is accomplished by controlling the rate of moisture release from thawing ice by maintaining the temperature of the product at or near 32° F. until substantially all moisture originally present as ice crystals has been removed. Following this phase, the drying of the porous product may then proceed according to conventional drying procedures, or the porosity of the product may even be augmented by removing the remaining bound water in the remaining gel structure under expanding or explosive conditions such as are described in my co-pending application Serial No. 9,578, filed February 18, 1960, for a process of producing an expanded dehydrated rice product.

In general, after the cooked rice has been quick frozen by subcooling well below the freezing point of its gel bound water (26° to 28° F.) viz., +20° to −30° F., it is subjected to an initial sublimation step under a high vacuum such as within the range of 4.5 mm. down to 0.05 mm. absolute pressure while gently heating the frozen mass by means of a series of closely spaced warming plates in which warm, compressed refrigerant gas or liquid, low pressure steam or warm water is circulated under thermostatic control from a temperature sensing element inserted in the slowly warming and incipiently thawing mass. For the ultimate in heat economy and ease of control, it is desirable to use compressed refrigerant in a heat pump cycle to effect the necessary warming for rapid dehydration of the product until its moisture content calculated on the wet basis is generally below 30 percent, after which its moisture content may be further reduced to from 5 to 15 percent by warm air drying at atmospheric pressures.

Once the moisture content of the rice product has been substantially reduced by sublimation, specifically by cold air of low humidity, or under the high vacuum conditions initially imposed when a high proportion of potential liquid phase moisture exists as ice crystals, higher absolute pressure may be tolerated. This is true because no substantial amount of free moisture yet exists to destroy porosity at the higher temperatures corresponding to the higher absolute pressures. Thus, while at 4.579 mm. absolute the corresponding temperature is 32° F., at 74 mm. absolute, or a vacuum of 27″ Hg, the corresponding temperature is 114° F. While the former absolute pressure, or even lower, is desirable in the first stages of dehydration when the liquid phase water potential is high; the latter is entirely satisfactory and advantageous because of faster evaporation rates, lower steam and water consumption by vacuum apparatus, and even much lower capital costs of the vacuum apparatus required once this moisture potential has been sufficiently reduced to not promote extensive absorption and rehydration at the higher temperature.

Another feature of this process is the control of the cooking time for the dehydrated rice product produced by this process by the conditions imposed during the drying process following freezing and partial removal of the moisture by sublimation and/or dehydration at low temperatures. Since the rehydration properties of the product are a function of its porosity following the precooking, quick freezing and low temperature drying operations, it is possible to control the cooking time of the dehydrated product by the temperature and duration of heating of the product in the final drying step. Temperature and time of exposure to heat determine the degree to which the pores and capillaries formed in the freeze-drying process are closed by shrinkage. By thus controlling the degree to which they are reduced, the time of the regenerative cooking process may be controlled.

For several reasons it is advantageous to use a quick freezing process to effect the freezing of the gel structures within the gelatinized rice product. First, it produces many small crystal nuclei throughout the shrunken gel structure which are fed by the migrating water released by syneresis. This causes subsequently a uniform and extensive porosity throughout the product. Second, the finished product is firmer as a result of the many but uniform pores and capillaries within it instead of fragile due to the presence of fewer large pores. Third, during the sublimation and low temperature drying stages less of the porosity is lost due to collapse of the pore wall structure and the release of large droplets of water which tend to wet and soak the area where the water had been confined. Fourth, and of importance much higher production rates are possible than from a slow freezing process in which an attempt is made to obtain porosity by slowly building crystals at or slightly under the freezing temperature. The latter process produces fewer but larger pores after the ice is removed in the subsequent sublimation and/or low temperature drying step, and is very time consuming. Production rates are very much slower in equivalent apparatus than when the quick freezing process which develops lower temperatures in much less time, is used.

Regardless, however, of the method and rate of freezing in producing gel coagulation and ice crystals within the gel voids, an important feature of this process is the avoidance of quick thawing under atmospheric or higher pressures and temperatures with the immediate release of free water which must be evaporated at temperatures between 80° F. and 180° F. Instead, following freezing, a low temperature dehydration process is instituted which allows removal of substantial proportions of the water content before the temperature of the mass exceeds 32° F.; and provides for continuance of the dehydration process to remove the major part of the water before warm air drying is used to produce the final dehydration. The latter is used to control the rehydration rate when the product is subjected to cooking by the housewife, commercial cook or industrial user; since the higher the temperature and/or the longer the exposure to warm air drying, the more pore shrinkage and closure occurs.

A further embodiment of this process provides for the rapid removal of residual moisture in hot air currents under conditions which produce further expansion and porosity in the product. After drying the product to a moisture content between 10 and 20 percent, it is exposed to a stream of hot air having temperatures ranging between 300° F. and 600° F. This produces an almost instantaneous flashing and expansion of the moisture within the product, some of which escapes as superheated water vapor and leaves further voids or pores within the product. Its moisture content has been reduced to within the range of 4 to 10 percent by this flash drying step which is preferably carried out in the fluidized state with a mixture of combustion gas products and superheated steam having a low free oxygen content. This treatment under controlled atmospheres is advantageous where a light colored product is desired, but if a toasted or browned product is desired, the flash drying and expansion process may be accomplished in a stream of hot air or combustion products where the oxygen content is not subjected to close control.

The process may be operated as batch, semi-continuous, or continuous operations. For example, the rice may be steeped, cooked, washed free of starchy cooking waters and drained by either a series of operations in the same vessel, or in a series of vessels in a continuous sequence of steps or operations. Likewise, the freezing and sublimation and drying steps may be conducted in a batch freezer or in a continuous belt freezer where the product is frozen and subsequently partially dehydrated under sublimation conditions by air blasts of low absolute humidity; or it may be frozen between parallel metal belts which are sprayed with refrigerated brine in a manner resembling the freezing of fish fillets, followed by partial dehydration by sublimation with air of low absolute humidity, or by means of a vacuum drying procedure. If, as in an illustrative embodiment, the frozen product is partially dried by sublimation of a proportion of the ice crystals and the fast removal of any liquid phase under high vacuum, this step may be more conveniently carried out in the freezing vessel by connecting it to a vacuum apparatus. Following a substantial removal of the product's moisture, the free flowing product may then be removed from the batch freezer and the remaining drying operations accomplished in any form of conventional dryer, but preferably in a tunnel dryer or fluidized system to avoid too much particle breakage and dust formation.

It has been proposed that rice be cooked and subjected to quick freezing to prepare a frozen, precooked rice product to be dispensed from frozen food cabinets in grocery stores and supermarkets. Such rice is not subjected to a dehydration process before packaging and sale, but is simply readied for the table by warming or even by thawing it in hot water, draining off the excess water and then warming for a few minutes to render it more dry and fluffy. Such products do not have wide appeal, however, because the frozen product represents relatively little food value at a high price per unit of dry substance. Moreover, unless preservatives are added, it does not keep very long and becomes infested with blue mold and other hardy fungi which originate in the raw rice and survive both the cooking and freezing processes.

Also, precooked, dehydrated rice has been prepared and marketed which differs widely both as to the product and process of manufacture from the product and processes of this invention. In the preparation of these other products, the rice is precooked and then dried in heated air or at elevated temperatures in a vacuum dryer. The gelatinized, cooked rice shrinks to a vitreous, chalky product in which the rice grains are severely "checked," i.e., there are many lines of fracture running across the grain which result from the drying operation. Advantage is taken of this "checked" condition of the individual grains to provide points of entry for water into their vitreous structure during the recooking operation in the housewife's kitchen. That product is also characterized by the formation of extensive conglomerates of individual grains and broken grain fragments when drying the sticky, gelatinized, cooked rice which when an attempt is made to separate them into individual grains results in the excessive production of broken grain particles and dust. The product of such process is very sensitive to overcooking and even to standing in the cooking vessel after it is removed from the heat source, and produces a mixture of soft, mushy gel resulting from the fines and dust in a mixture with undercooked, chalky particles resulting from the larger vitreous particles which resist hydration in the regeneration cooking operation. Actually, that is the type of product which would be produced even if the cooked, frozen rice should be subjected to similar conditions during dehydration, and it is this which this process is specifically designed to avoid.

In accordance with an illustrative embodiment of this invention, the procedure is to remove by sublimation enough of the free water surrounding the rice grains as interstitial water and within the grains as released water resulting from gel shrinkage directly from the ice phase at a temperature of 32° F. or lower under very high vacuum to minimize the effects of reabsorption of liquid phase moisture by the coagulated gels. An alternate but slower procedure is to evaporate the water at temperatures between the freezing point of the gel and somewhat above the freezing point of water with cold, dehumidified air or under conditions where very little, if any, free water appears in the liquid state to deleteriously affect the porous structure in the product. Both procedures may be used in a sequence, i.e., a considerable proportion of the water may first be removed by sublimation under high vacua, and after the product is sufficiently dry and free flowing, the drying may be continued in cold air under less than saturated humidity conditions, or by means of a vacuum drying procedure. Finally, after the free water is substantially or entirely removed, and the remaining water is that bound in the gels, resort may be had to forced drying with warm air to complete the dehydration process and control the nature of the porous structure and thereby the rehydration properties of the finished product. This may be accomplished by heating ambient air or the use of clean combustion products. For advantageous results, it is desirable to use warm air which has previously been dehydrated by passing it through a bed of silica gel or other dry desiccant, or else through a solution of a salt such as lithium chloride or calcium chloride. Dry air of this character prevents an undue temperature rise in the product because of its evaporative cooling effect.

An important result from the practical standpoint of this process of processing the precooked rice is that it provides a means of handling it in process without the troublesome complications which occur when the sticky, gelatinous product must be directly handled and conveyed to and through drying apparatus. Thus are avoided the conglomerates, the fines and the fouling of heating surfaces and vessel walls with dried, horny films which result from smearing them with the wet gels. These advantages, alone, provide the difference between processes characterized by operating difficulties, high production costs, reduced yields, a disproportionate content of fines and nonuniform rehydration when recooked; and a satisfactory process which produces high yields of whole rice particles and a porous, dehydrated product which rehydrates uniformly when handled in the kitchens in homes, commercial establishments and food plants to yield a reconstituted cooked rice of uniform grain size, texture and excellent flavor.

The following examples are representative of various embodiments of this invention. It will be understood, however, that other procedures and combinations of batch, semi-continuous and continuous operations may be used within the scope of the appended claims without departing from the spirit and intent of this invention.

*Example I*

Figure 1A:
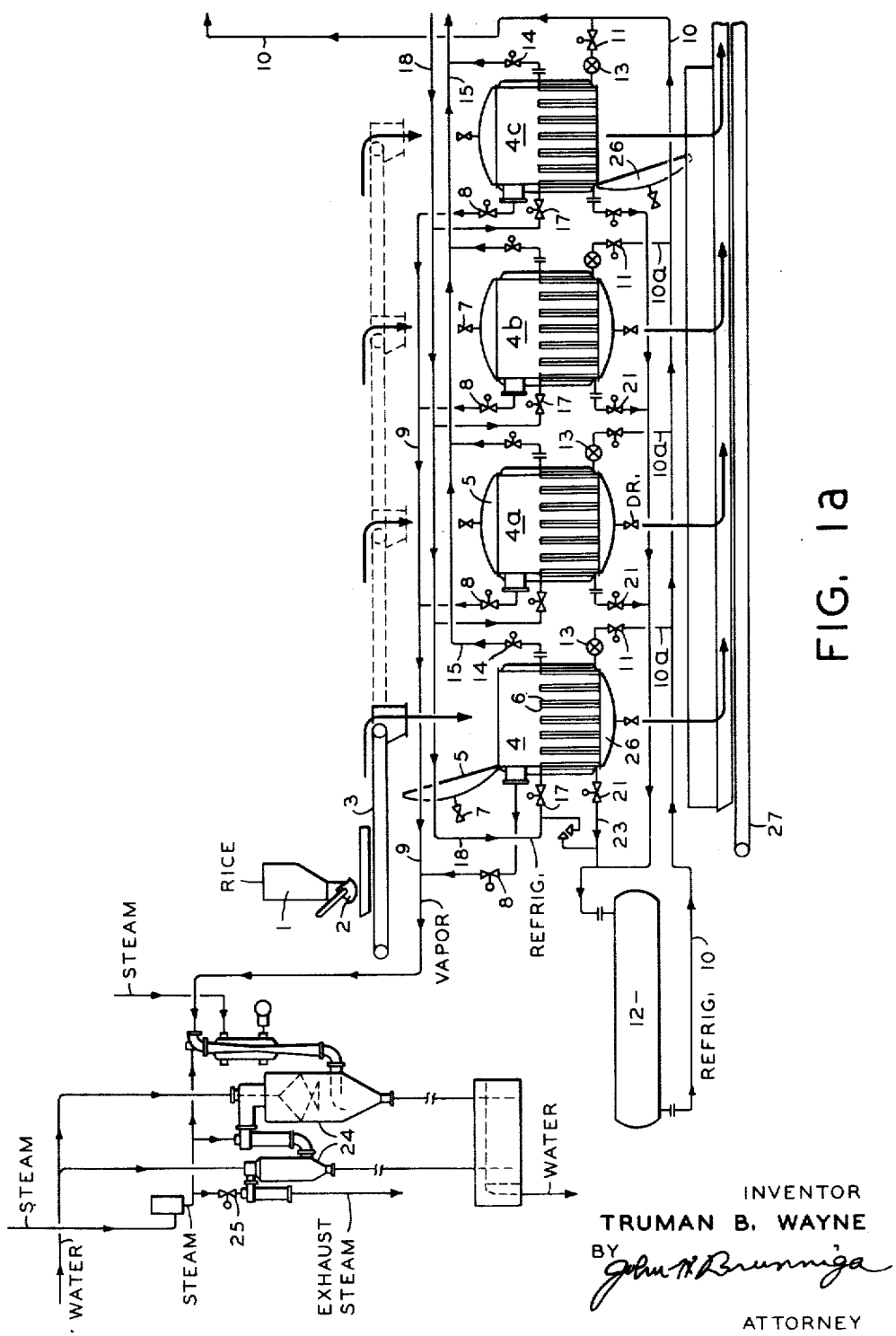
FIGS. 1a and 1b represent a diagram of the flow sheet.
Figure 1B:
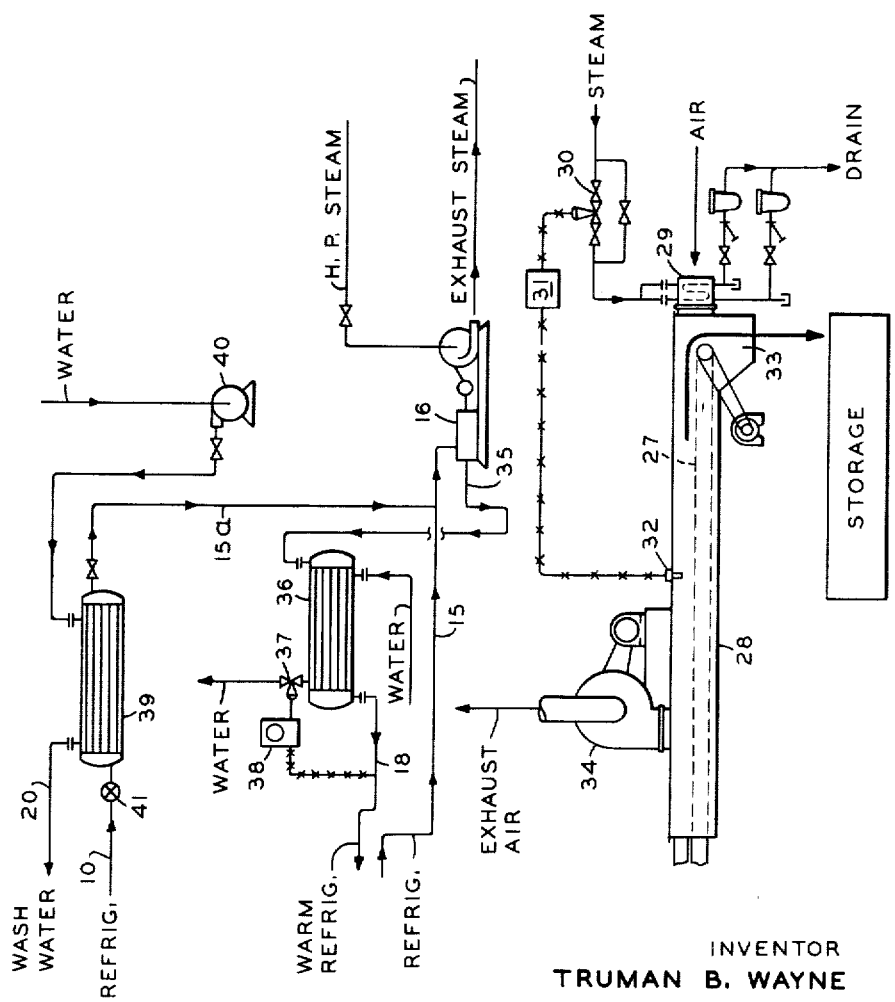
Figure 2:
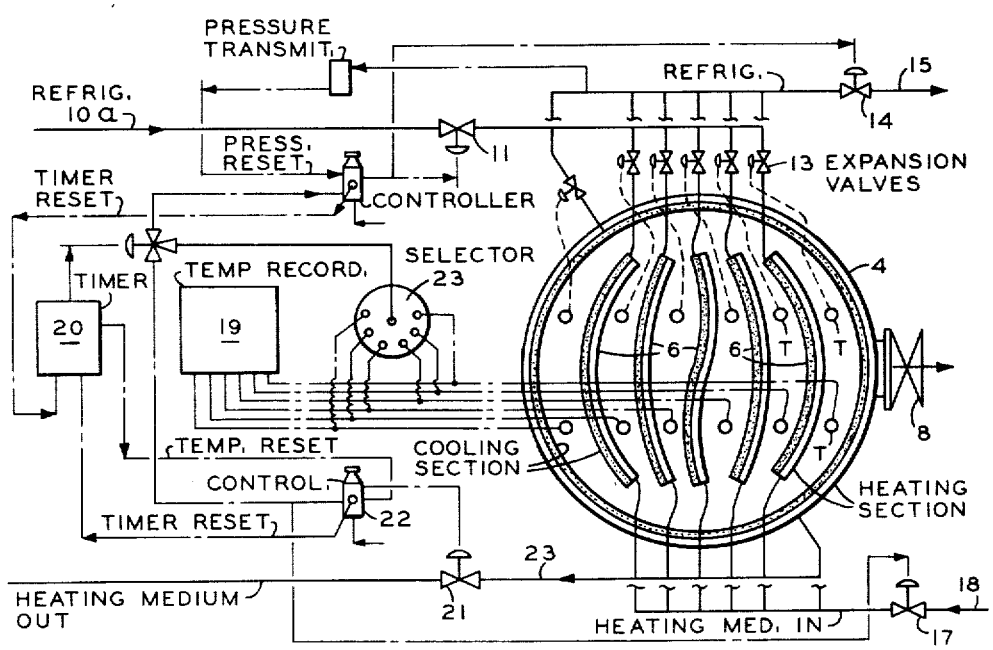
FIG. 2 is a detail plan partly in section of the freezer-sublimator.
Figure 3:
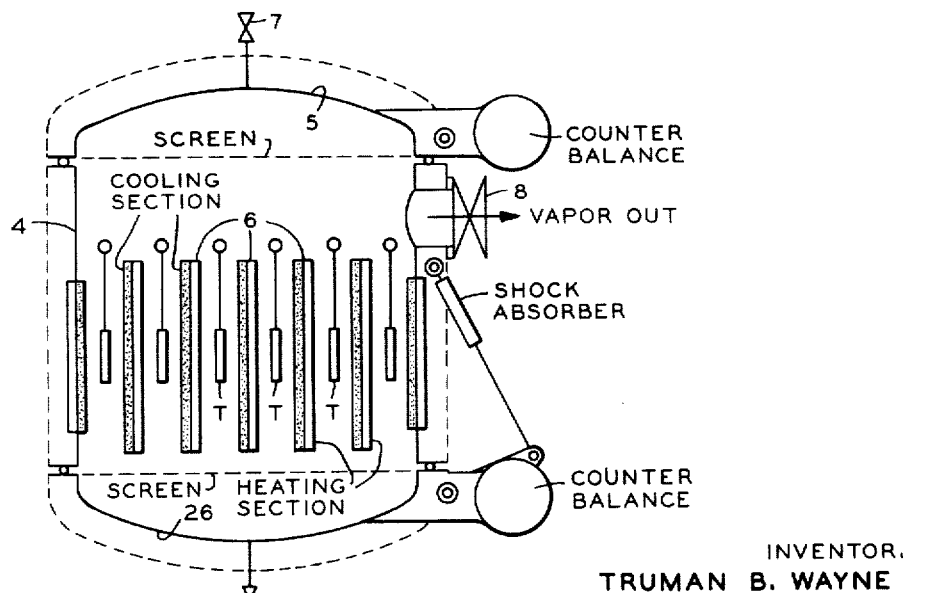
FIG. 3 is a detail elevation partly in section of the freezer-sublimator.

Reference is made to the process diagrams in FIGS. 1a, 1b, 2 and 3. Rice which has been cooked to the desired extent, separated from its cooking waters, freed from adhering starchy and glutinous matter by thorough washing, and drained of free surface moisture by any suitable method, for example, as prepared in accordance with the process disclosed in applicant's copending application, Serial No. 9577, filed February 18, 1960, is withdrawn from hopper 1 by means of gate 2 and discharged on shuttle belt conveyor 3 for delivery to one of the freezer-sublimator vessels 4, 4a, 4b or 4c, whichever is ready in their cycle sequence to receive a charge of prepared rice. These vessels are all identically equipped with a hinged upper head 5 which is opened and thrown back in order that the charge of rice may fall into the freezing spaces between cold plates 6. The vessels are filled to a height above the plates not to exceed half the horizontal distance between cold plates which are spaced vertically within the vessel on relatively close centers in order to speed the freezing, and later the thawing processes. After filling, the head 5 is closed and tightly secured, vacuum breaker valve 7 is closed, block valve 8 to the vacuum line header 9 is closed, valves 17 and 21 on the warm refrigerant lines are closed, and liquid refrigerant is admitted from refrigerant header 10 into branch pipe 10a by opening block valve 11. The liquid refrigerant surge storage is in refrigerant receiver 12. The liquid refrigerant passes through automatic expansion valve 13, which may be either the thermostatic or pressure control type, and enters one side of the cold plates 6 where it expands to a gas, or a mixture of liquid and gaseous refrigerant, and extracts heat from the rice before passing out of the cold plates through open block valve 14 into the spent refrigerant header 15 which delivers the expanded gas to refrigerant compressor 16. All of the cold plates 6 may be connected through a common header to a single expansion valve 13, but for uniform cooling and fast freezing, it is preferable to extend pipe 10a as a common feed header and to provide a separate expansion valve to each cold plate.

Each freezer-sublimator is equipped with a number of temperature sensing elements which are connected through a selector switch to a temperature recorder-controller 19. The latter in turn controls the solenoid- or air motor-equipped liquid refrigerant block valve 11 on pipe 10a, and likewise the similarly equipped valve 17 which controls compressed refrigerant from warm refrigerant header 18. This control which either fully opens or closes these block valves without modulation, is exercised through an interposed cycle timer 20 which is energized when the temperature of the frozen mass reaches the desired temperature. After the time for which the cycle timer is set has passed, the latter energizes an electrical or compressed air circuit which closes valve 11 and opens valve 17. Control valve 21, likewise operated through a temperature controller 22, is located in a pipe manifold which connects to the discharge nozzles on the warming side of all cold plates 6. The function of temperature controller 22 is to regulate the flow of warm refrigerant through the warming side of cold plates 6 to induce the controlled warming of the frozen rice at all successively selected temperature settings between 28° F. and 120° F. to effect sublimation of ice crystals and/or evaporation of slowly released moisture under high vacua. Lower temperatures than 28° F. will effect sublimation of ice crystals under high vacua when the vacuum apparatus is connected through valve 8 to the vessel, but the rate of moisture removal is slow. For that reason, higher sublimation and evaporation temperatures are used in the initial moisture removal operation. The same cycle timer 20 can be adapted to not only operate the control valves as above described, but can automatically reset the control temperatures at timed intervals to stepwise increase the temperature control points as moisture removal proceeds. Thus, after sufficient time lapse to have effected removal of approximately one-half of the moisture, control valve 21 is more fully opened by controller 22 to allow increased flow of warm refrigerant and steam to final stage of the three-stage vacuum apparatus 24 is shut off by closing steam control valve 25. This causes the vacuum in the vessel to fall to approximately 27" Hg which corresponds to a temperature of 114° F. This produces rapid thawing and simultaneous removal of any desired part of the moisture remaining in the product without materially affecting the porosity of the product which freezing has provided.

After the product has been dehydrated under sublimation and vacuum evaporation conditions to a moisture content of approximately 25 percent, wet basis, it is sufficiently dry and free flowing to allow subsequent handling in a continuous drying operation. Lower hinged head 26 is then opened, preferably by means of a hydraulic cylinder which is also controlled from cycle timer 20. The partially dried rice falls to conveyor 27 and passes through tunnel dryer 28 where it is dried to the desired moisture content. If no further processing is contemplated, the final moisture content will range from 4 to 14 percent. If the rice will be subjected to the expansion drying process disclosed in this co-pending application, Serial No. 9,578, filed February 18, 1960, its moisture content should be within the range of 10 to 20 percent for best results. The final moisture content will range between 4 and 10 percent after this additional processing operation.

Tunnel dryer 28 consists of conveyor 27, a suitable housing, air heater 29, steam control valve assembly 30 which is actuated from temperature controller 31 by temperature sensing element 32 which may be located either in the warm air current over and through the product, or in discharge hopper 33. Dryer fan 34 moves the air through the air heater 29, over and through the product on conveyor 27 and discharges the partially saturated air from the dryer housing.

The freezer-sublimator vessels are arranged in groups of four, or multiples of four for most efficient production cycle control. Thus, in FIG. 1a, while vessel 4 is receiving its charge, vessel 4a has been filled previously and is receiving expanded refrigerant from pipe 10 through its valves 11 and 13. Vessel 4b is simultaneously receiving compressed, warm liquid and/or gaseous refrigerant from pipe 18 through block valve 17 and is discharging it through block valve 17 and is discharging it through control valve 21 into pipe 23 which delivers the subcooled, liquid refrigerant to refrigerant receiver 12. Vessel 4c has been through its refrigeration and thawing operations and is discharging to conveyor 27 preparatory to resuming its cycle of operations.

In order to provide compressed refrigerant at any convenient temperature for the thawing operation, the expanded refrigerant gas which returns to the compressor 16 from a vessel in its freezing stage is compressed and sent through pipe 35 to water-cooled condenser 36. The amount of cooling water to the condenser is regulated by control valve 37 which is actuated by temperature controller 38 having its temperature sensing element in pipe 18 which is the warm refrigerant header that supplies the warming plates 6 in the freezer-sublimators 4, 4a, 4b and 4c. Thus, there is provided a wide latitude in the selection of the warm refrigerant stream temperature which loses its heat to the frozen rice product, and is fully condensed and super-cooled for delivery to refrigerant receiver 12 from which it returns through pipes 10 and 10a to the expansion valve 13 of the respective freezer-sublimator vessels.

Water chiller 39, while not a unit in the rice freezing and dehydration processes herein disclosed, is an important feature of the rice cooking and preparation process which is the subject of my co-pending application, Serial No. 9577, filed February 18, 1960. It, therefore, operates on liquid refrigerant from line 10 through expansion valve 41 and discharges spent refrigerant gas through return pipe 15a to refrigerant compressor 16. Chiller 39 is supplied with acidified wash water from a suitable storage tank by means of pump 40.

*Example 2*

The quick freezing operation may be conducted by the use of expanded refrigerant in cold plate exchangers as described in Example 1. This process involves a relatively high horsepower requirement to drive the refrigerant compressor when the rice charge is cooled from 70° F. to −20° F. For instance, a refrigeration load of approximately 6 tons (72,000 B.t.u./hr.), when the evaporating temperature of the refrigerant is −28° F. and its condensing temperature is 95° F., requires a driver of approximately 20 horsepower for the refrigerant compressor. Since refrigeration is calculated on the B.t.u./hr. basis, this is the equivalent of 20 horsepower hours, or 14.9 kilowatt hours, at full load.

For processing plants with ample supplies of steam and condensing water, it is often desirable, costwise, to use steam jet refrigeration to cool the rice charge to its freezing point and to complete the freezing with expanded refrigerant after having cooled to the freezing point of the rice by means of steam jet refrigeration. The advantage of precooling with steam jet refrigeration to the freezing point of the rice is that the major refrigeration load occurs between the temperature at which cooked rice is charged into the freezer, say 70° F., to its freezing point of approximately 28° F. Cooked rice has a specific heat above its freezing point of approximately 0.83, whereas below freezing the average specific heat is only 0.46. Furthermore, the heat of fusion of cooked rice is approximately 114 B.t.u. per pound as compared to water of 144 B.t.u. per pound. Consequently, in cooling cooked rice to its freezing point, followed by subcooling to −20° F., the first stage requires about 87 percent of the refrigeration load and the subcooling stage only the remaining 13 percent. The large part of the total refrigeration load between 70° F. and 28° F. may be handled with relatively simple three or four stage steam jet apparatus having water cooled intercondensers, and where sufficient steam and condensing water are available and electric power is insufficient or expensive, important processing economies may result.

As a specific embodiment of the above, reference is had to FIGS. 1a, 1b, 2 and 3. Cooked, shelled rice is charged into freezer-sublimator 4, 4a, 4b or 4c from hopper 1 through gate 2 and from shuttle belt conveyor 3 as described in Example 1. After closing head 5, vacuum breaker valve 7 is closed and block valve 8 to the vacuum line header 9 is opened to evacuate the vessel by means of vacuum apparatus 24. This produced flash evaporation of a relatively small proportion up to approximately 10 to 12 percent of the moisture content of the rice, largely that contained on the surface and within the outermost surface layers, and cools the rice to any desired temperature down to, and, inclusive of, its freezing point. The final temperature limitation is imposed either by the method of operation or the nature of the vacuum apparatus, i.e., whether three, four or five stages with and without intercondensers. For this purposes three to four stage apparatus with intercondensers between two or three stages is sufficient.

After the preliminary vacuum cooling process, valve 8 is closed and refrigerant is admitted to the cold plates in the manner described in Example 1 to complete the subcooling to any desired point within the range of +20° F., or lower, as previously described. Following the freezing and/or subcooling with expanded, liquid refrigerant, sublimation is carried out under vacua by means of a warm fluid in the cold plates 6 as previously described under Example 1, and the partially dehydrated rice is then discharged from the freezer-sublimator vessel and its drying completed by either of the alternate methods described in Example 1.

It may readily be understood from the foregoing that steam jet vacuum apparatus which is used in the sublimation and evaporation procedures described in Example 1 is also suitable for the precooling step, and may be used to any desired degree as an auxiliary to the direct expansion refrigeration step; moreover, that since such apparatus must be provided for the post-freezing operations, its use in precooling can reduce the capital investment required in referigeration compressors and auxiliaries.

While in the foregoing descriptions certain apparatus, piping, valving and control arrangements have been disclosed and illustrated in FIGS. 1a, 1b, 2 and 3, functional equivalents as to equipment, arrangements and procedures are within the scope of the appended claims. The claims which follow are related to the process steps and sequences, and no claim is here made either to the product or the equipment except in their interrelations and functions in the process of manufacture.

Whereas applicant has described an instrumentation scheme for handling valve opening and closing operations because of the obvious labor savings and ease of controlling the process in an industrial plant employing this process, it is understood that equivalent manual operations may be substituted.

Instead of the heat pump principle herein disclosed, steam, warm water or other fluids may be employed in the thawing operation. Likewise, it is possible when utilizing the heat pump principle to successively circulate the expanded refrigerant and then the warm, compressed refrigerant through the same side of the heat exchanging cold plates. However, the methods disclosed are advantageous because of their superior heat balance and simplification of piping, valving and control.

In the following claims references are made to temperatures within the range of minus 30° F. to plus 30° F. during the freezing operation, whereas previously in the specification a temperature of from plus 20° F. to minus 30° F., or lower is specified for the quick freezing step. The temperature ranges are not conflicting or contradictory for the reason that although the quick freezing step, per se, will carry the temperatures lower than plus 30° F., or only 2° F. below the freezing point of water, which is also approximately the upper termperature limit (26°–28° F.) where the starch gel will freeze; it is also true that in raising the temperature of the quick frozen rice to the maximum temperature where sublimation of ice can occur without formation of liquid phase, the starch gel in the frozen rice is still frozen and the ice crystals therein are still expanding in their solid phase state to augment the pore-forming action which characterizes this process. Thus, in being yet frozen at 30° F. and in reaching a maximum rate of sublimation within a temperature range of 28° F. to 32° F., the rice is still being subjected to a freezing action together with a sublimation action which are jointly contributing to pore formation as the ice expands and enters the vapor phase. All subsequent steps in this process relating to moisture removal are designed to remove ice crystals and any incipient liquid phase that may be formed under conditions which prevent or substantially limit absorption of liquid phase moisture by the porous, hydrophilic structures then existing in the freeze processed rice.

It should also be understood that the lower temperature range specified in the quick freezing operation, while sufficient to produce the desired product, may be carried even lower without departing from the spirit and intent of this invention. Furthermore, that there can be a reasonable degree of overlapping of temperatures and in low vacuum or atomospheric pressure drying once the product is partially dried to the extent that more conventional drying operations, such as are herein disclosed for the final stage drying, are practicable.

It will be understood that the expressions "sublimation" and "sublimation operation" are used in the sense to include the dynamic condition under which ice vapor removal is effected, viz., by the use of high vacuum, or the dehydrating effect of dehumidified air or other gases of low absolute humidity which will remove ice vapor while exerting an evaporative cooling effect which maintains the temperature of the frozen mass at a temperature not exceeding 32° F.

It will be further understood that when the water content of the frozen product has been sufficiently reduced by one or both of the above described sublimation procedures to approximately 30%, or below, from its original water content of 76–82%, air drying at elevated temperatures and atmospheric pressure, or higher, may be employed to finish the drying to from 5 to 15%.

In the specification the expression "syneresis" is used descriptively in the sense of describing an effect. The definition of "syneresis" is "the contraction of a clot or a gel." When a gel shrinks and liberates water, it is only an effect and not a mechanism. Syneresis is merely the observed effect of water liberation by gel coagulation and shrinkage. The chilling and freezing action is actually the mechanism which induces coagulation and shrinkage, i.e., "syneresis." Freezing produces coagulation and shrinkage of the gel, which in turn liberates part of the gel's "bound water." The observed effect is syneresis.

While in this specification theories have been advanced, it will be understood that that has been done to facilitate the disclosure; for this invention is not limited to any theory or theories.

Having thus described the invention, what is claimed and desired to be secured by Letters Patent is:

1. The process of preparing a dehydrated porous rice product, comprising, subjecting discrete gelatinized rice grains to a freezing operation at a temperature sufficiently low and for a period sufficient so as to freeze the interstitial water and the gel-bound water in the grains as ice, and subjecting the frozen gelatinized rice grains to a sublimation operation under dynamic conditions and within a temperature range including the temperature of the frozen gelatinized rice grains and up to 32° F. and for a period sufficient so as to remove a substantial part of the interstitial and gel-bound ice as ice vapor and so as to produce flowing rice grains and so as to produce voids or pores in the rice grains but so as to preserve their porous structure.

2. The process of preparing a dehydrated porous rice product, comprising, subjecting discrete gelatinized rice grains to a freezing operation at a temperature sufficiently low and for a period sufficient so as to freeze the interstitial water and the gel-bound water in the grains as ice, subjecting the frozen gelatinized rice grains to a sublimation operation under dynamic conditions and within a temperature range including the temperature of the frozen gelatinized rice grains and up to 32° F. and for a period sufficient so as to remove a substantial part of the interstitial and gel-bound ice as ice vapor and so as to produce flowing rice grains and so as to produce voids or pores in the rice grains but so as to preserve their porous structure, and thereafter subjecting the resultant rice grains to a drying operation at a temperature above 32° F. and for a period sufficient so as to remove an additional substantial part of the water by evaporation in order to produce additional voids or pores in the rice grains.

3. The process of preparing a dehydrated porous rice product, comprising, subjecting discrete gelatinized rice grains to a freezing operation at a temperature sufficiently low and for a period sufficient so as to freeze the interstitial water and the gel-bound water in the grains as ice, and subjecting the frozen gelatinized rice grains to a sublimation operation under a high vacuum and within a temperature range including the temperature of the frozen gelatinized rice grains and up to 32° F. and for a period sufficient so as to remove a substantial part of the interstitial and gel-bound ice as ice vapor and so as to produce flowing rice grains and so as to produce voids or pores in the rice grains but so as to preserve their porous structure.

4. The process of preparing a dehydrated porous rice product, comprising, subjecting discrete gelatinized rice grains to a freezing operation at a temperature sufficiently low and for a period sufficient so as to freeze the interstitial water and the gel-bound water in the grains as ice, subjecting the frozen gelatinized rice grains to a sublimation operation under a high vacuum and within a temperature range including the temperature of the frozen gelatinized rice grains and up to 32° F. and for a period sufficient so as to remove a substantial part of the interstitial and gel-bound water as ice vapor and so as to produce flowing rice grains and so as to produce voids or pores in the rice grains but so as to preserve their porous structure, and thereafter subjecting the resultant rice grains to a drying operation under a lower vacuum and at a temperature above 32° F. and for a period sufficient so as to remove an additional substantial part of the water by evaporation in order to produce additional voids or pores in the rice kernels.

5. The process of preparing a dehydrated porous rice product, comprising, subjecting discrete gelatinized rice grains to a freezing operation at a temperature sufficiently low and for a period sufficient so as to freeze the interstitial water and the gel-bound water in the grains as ice, and subjecting the frozen gelatinized rice grains to a sublimation operation while subjected to the action of a gas of low humidity and while the product is within a temperature range including the temperature of the frozen gelatinized rice grains, and up to 32° F. and for a period sufficient so as to remove a substantial part of the interstitial and gel-bound ice as ice vapor and so as to produce flowing rice grains and so as to produce voids or pores in the rice grains but so as to preserve their porous structure.

6. The process of preparing a dehydrated porous rice product, comprising, subjecting discrete gelatinized rice grains to a freezing operation at a temperature sufficiently low and for a period sufficient so as to freeze the interstitial water and the gel-bound water in the grains as ice, subjecting the frozen gelatinized rice grains to a sublimation operation while subjected to the action of a gas of low humidity and while the product is within a temperature range including the temperature of the frozen gelatinized rice grains, and up to 32° F. and for a period sufficient so as to remove a substantial part of the interstitial and gel-bound ice as ice vapor and so as to produce flowing rice grains and so as to produce voids or pores in the rice grains but so as to preserve their porous structure, and thereafter subjecting the resultant rice grains to a drying operation at a temperature above 32° F. and for a period sufficient so as to remove an additional substantial part of the water by evaporation in order to produce additional voids or pores in the rice grains.

References Cited in the file of this patent

UNITED STATES PATENTS

| | | |
|---|---|---|
| 2,785,070 | Kester et al. | Mar. 12, 1957 |
| 2,808,333 | Mickus et al. | Oct. 1, 1957 |

OTHER REFERENCES

"Food Industries," January 1945, pp. 92 to 95, 168, 170, 172, 174, 176, and 178. Article entitled "Drying by Sublimation."

"Food Technology," 1958, vol. XII, No. 9, pp. 464 to 468. Article entitled "The Effect of Freezing on the Hydration Characteristics of Rice."

UNITED STATES PATENT OFFICE
CERTIFICATE OF CORRECTION

Patent No. 3,085,012                                April 9, 1963

Truman B. Wayne

It is hereby certified that error appears in the above numbered patent requiring correction and that the said Letters Patent should read as corrected below.

Column 1, line 18, strike out "and"; column 2, line 53, after "rice" insert -- is --; column 4, line 75, and column 5, line 1, strike out "viz., 0.05 mm. to 4.5 mm."; column 10, line 19, strike out "through block valve 17 and is discharging it --; column 13, lines 18, 32 and 52, and column 14, lines 5, 25 and 40, before "flowing", each occurrence, insert -- free --.

Signed and sealed this 11th day of February 1964.

(SEAL)
Attest:
ERNEST W. SWIDER

Attesting Officer

EDWIN L. REYNOLDS

Acting Commissioner of Patents